Figure 1:
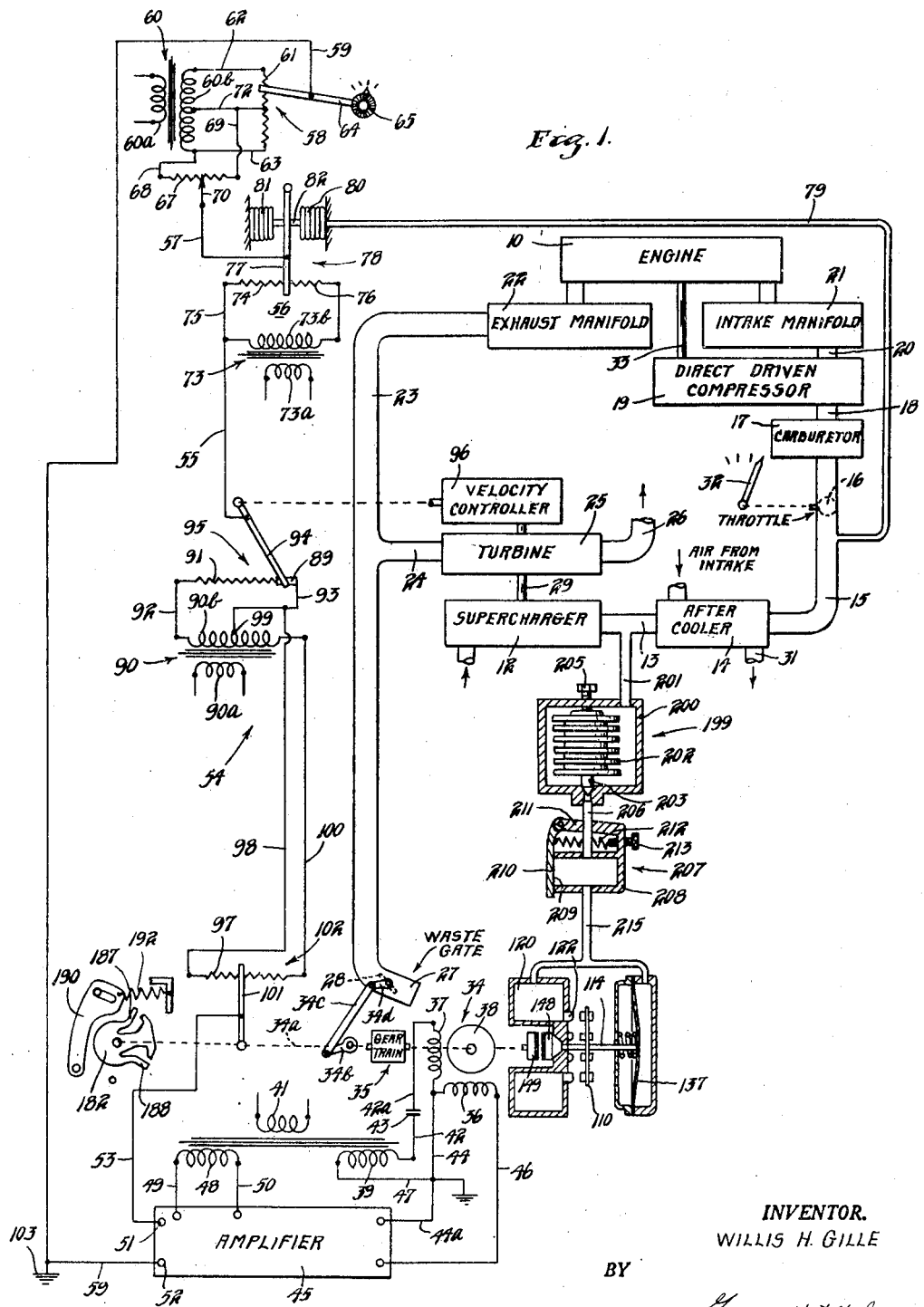

INVENTOR.
WILLIS H. GILLE
BY George H. Fisher
ATTORNEY

Nov. 8, 1949     W. H. GILLE     2,487,049
REGULATING MOTOR FOR SUPERCHARGERS
Filed March 29, 1946     2 Sheets-Sheet 2
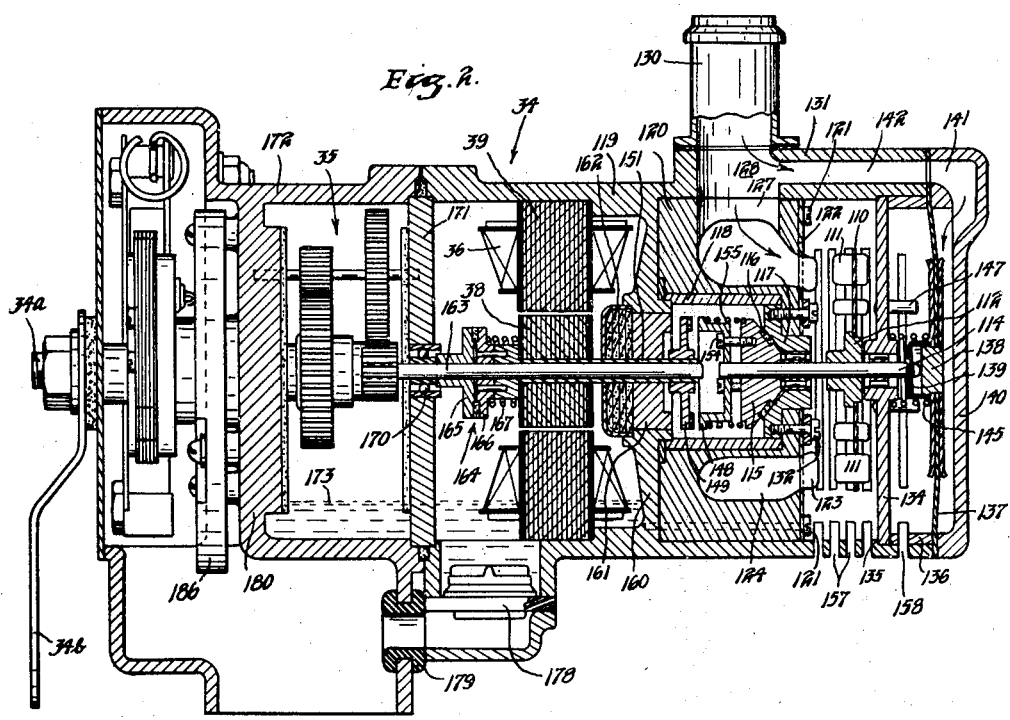
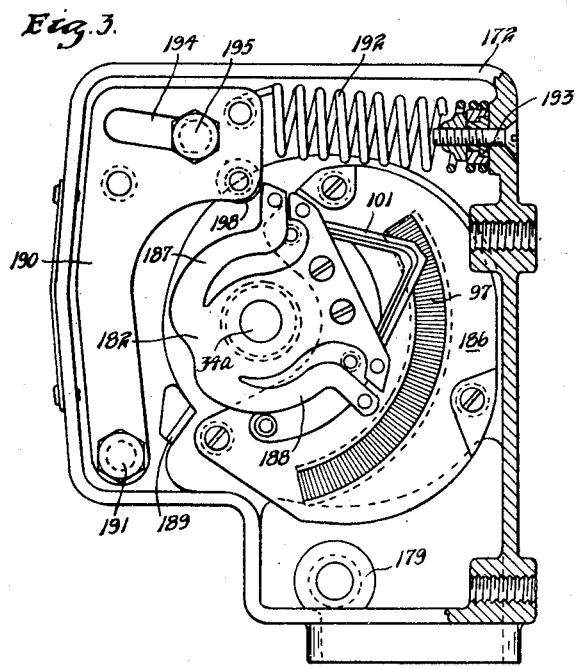
INVENTOR.
WILLIS H. GILLE
BY
George H. Fisher
ATTORNEY Patented Nov. 8, 1949

2,487,049

UNITED STATES PATENT OFFICE 2,487,049

REGULATING MOTOR FOR SUPERCHARGERS

Willis H. Gille, St. Paul, Minn., assignor to Minneapolis-Honeywell Regulator Company, Minneapolis, Minn., a corporation of Delaware Application March 29, 1946, Serial No. 658,021

8 Claims. (Cl. 230—5)

The present invention is concerned with a motor adapted to be employed in connection with pressure controlling apparatus.

In connection with the control of superchargers for engines, such as internal combustion engines, it is common to control the discharge pressure of the supercharger at a predetermined value. A typical control apparatus for performing this function automatically is shown in the patent to Daniel G. Taylor, 2,388,350, granted November 6, 1945. In this patent there is shown an arrangement in which an electric motor is automatically controlled in accordance with the pressure on the discharge side of the supercharger and positions a waste gate for a turbine driving the supercharger so as to maintain the pressure being controlled at a selected value. In the copending application of Stephen Crum, Serial No. 658,360, filed concurrently herewith, there is disclosed an improvement on such a system, which improvement consists of providing an air motor which is effective to position the waste gate or other compressor controlling member in the event of the air pressure rising to an undesirable value due, for example, to a failure of electrical power. In the arrangement of Crum, the air motor takes the form of an air turbine which is mounted coaxially with the electric motor and is effective to drive the waste gate through the rotor of the electric motor. The present invention is particularly concerned with improvements in such a motor and in the system employing this motor.

An object of the present invention is to provide in combination with an electric motor, a fluid motor adapted to drive the output shaft of the electric motor and clutch means which is effective to disconnect the fluid motor from the electric motor and hence to prevent the fluid motor from retarding the action of the electric motor during normal operation of the electrical motor.

A further object of the present invention is to provide such an arrangement where the clutch is operated by means responsive to the pressure fluid supplied to the fluid motor.

A further object of the present invention is to provide such an arrangement in which an oil seal member is associated with a normally stationary element of the clutch and is effective during normal operation of the electric motor to seal the electric motor chamber against the escape of oil therefrom.

A further object of the present invention is to provide such an arrangement in which one clutch member is carried by the electric rotor shaft and another clutch member by the fluid motor shaft, the two shafts being coaxially disposed.

A further object of the invention is to provide a pressure control system in which the discharge pressure is normally automatically controlled by means positioned by a first motor and in which upon the pressure rising unduly, a normally free air motor is connected to said first motor to drive the same.

Other objects of the invention will be apparent from a consideration of the accompanying specification, claims, and drawing, of which Figure 1 is a schematic showing of my improved motor incorporated into a system for controlling the pressure of the air supplied to an internal combustion engine, Figure 2 is a vertical sectional view of my improved motor, and Figure 3 is an end view of my motor with the end cover removed and with portions broken away.

Referring now more particularly to Figure 1, I show therein an engine 10, which may be the engine of an aircraft. Air for supporting combustion in the engine passes from an intake 11 through a compressor 12, a conduit 13, an aftercooler 14, a conduit 15, a throttle 16, a carburetor 17, a conduit 18, a direct driven compressor 19, a conduit 20, and an intake manifold 21 into the engine.

The exhaust gases from the engine issue from an exhaust manifold 22 and are discharged through a duct 23 having a branch 24 leading to a turbine 25. The turbine is provided with an outlet 26 through which the exhaust gases may escape to atmosphere after passing through the turbine. The conduit 23, commonly termed the exhaust stack, also has an outlet 27 to atmosphere, and controlling the flow of exhaust gases from this outlet is a damper or valve 28 known as the waste gate.

The compressor 12 is driven from the turbine 25 through a shaft 29 and the air compressed in this compressor 12 passes through the aftercooler 14, wherein the heat of compression is at least partly removed by passing fresh air from an intake 30 in heat exchanging relation with the compressor discharge air, after which the cooling air is delivered at the outlet 31.

The throttle 16 may be adjusted by the hand control 32, and in the carburetor 17 fuel from a supply (not here shown) is mixed with the air to form a combustible gas.

The compressor 19 is directly driven from the engine by shaft 33 and is utilized not only as a compressor but also to evenly distribute the mixture of fuel and air to all cylinders of the engine.

The waste gate 28 is driven by a motor 34 through a gear train 35. A shaft 34a is connected to the output of the gear train 35 and a crank arm 34b is secured to the shaft 34a. A link 34c extends from the crank arm 34b to a crank arm 34d secured to the waste gate 28. The motor 34 is of the split phase type, being provided with a pair of field windings 36 and 37 which are spaced ninety electrical degrees apart, and an armature 38. The field winding 37 is supplied with electrical energy from a secondary winding 39 of a transformer 40 having a primary winding 41 which is connected to a suitable source (not shown) of alternating current. The energizing circuit for the winding 37 may be traced from the left-hand terminal of the transformer winding 39 through a conductor 42, a condenser 43, a conductor 42a, the field winding 37, and conductors 44 and 47 to the right-hand terminal of the secondary winding 39.

The flow of electrical energy to the motor field winding 36 is controlled by an electronic amplifier 45 to which the winding is connected by conductors 46, 44, and 44a. The amplifier 45 is powered from another secondary winding 48 on the transformer 40, to which the amplifier is connected through conductors 49 and 50.

The amplifier 45 is provided with a pair of input terminals 51 and 52 and operates to supply the field winding 36 of the motor with alternating current the phase of which depends upon the phase of an alternating current signal impressed across these input terminals 51 and 52. Any suitable form of amplifier may be used, but I prefer to employ one of the type shown in Fig. 1 of the co-pending application of Albert P. Upton, Serial No. 437,561, filed April 3, 1942, now Patent No. 2,423,534, issued July 8, 1947.

It will be evident that if the motor field winding 36 is supplied with alternating current which leads the current in the other field winding 37 by ninety electrical degrees the motor will rotate in one direction, whereas if the current in winding 36 lags the current in winding 37 by this amount, the motor will rotate in the opposite direction.

The phase of the signal applied to the amplifier input terminals 51 and 52 is determined by the electrical conditions existing in a compound network which consists of three separate networks connected in series. The circuit between the amplifier input terminals may be traced from terminal 51 through a conductor 53, a first electrical network 54, a conductor 55, a second electrical network 56, a conductor 57, a third electrical network 58, and a conductor 59, back to the input terminal 52.

The network 58 includes a transformer 60 having a primary winding 60a and a secondary winding 60b across the terminals of which is connected a slidewire resistance 61 by means of conductors 62 and 63. The conductor 59 is connected to a slider 64 which cooperates with the resistance 61 and which is adjustable thereacross by means of a control knob 65. The resistance 61 and slider 64 together form a control point adjuster 66 or manual selector for the intake manifold pressure control system.

Another slidewire resistance 67 is connected across one-half of the transformer secondary winding 60b by a conductor 68 connected to a lower terminal thereof and a conductor 69 connected to a center tap on the winding. A slider 70 cooperates with the resistance 67 to form a calibrating potentiometer designated generally at 71. The center tap of the winding 60 is connected by a conductor 72 to the center of the resistance 61 to decrease the impedance between the sliders 64 and 70.

The network 56 comprises a transformer 73 having a primary winding 73a and a secondary winding 73b across the terminals of which is connected a slidewire resistance 74 by means of conductors 75 and 76. Cooperating with this resistance 74 is a slider 77 which is connected to slider 70 by a conductor 57. The slider 77 and the resistance 74 together form a main pressure controller represented generally at 78, and this controller is adjusted in accordance with the pressure in the induction system of the engine. For this purpose a pressure take-off duct 79 is connected to any suitable point between the supercharging compressor 12 and the engine, and is here shown as connected to the duct 15 leading to the throttle 16. The duct 79 conveys the air pressure to the interior of a bellows 80. A second bellows 81 is evacuated and the two bellows 80 and 81 are supported with their free ends extending toward each other at opposite sides of the slider 77. These free ends are connected by link 82 to each other and to the slider 77 so that expansion and contraction of the bellows 80 in response to fluctuations in air pressure therein will shift the slider along the resistance 74. The evacuated bellows 81 compensates this controller for variations in atmospheric pressure in a well known manner.

The network 54 includes a transformer 90 having a primary winding 90a and a secondary winding 90b. A slidewire resistance 91 is connected by conductor 92 to one terminal of secondary winding 90b and by a conductor 93 to an intermediate point or tap 99 on the winding. A slider 94 cooperates with the resistance 91 and is connected to the slider 86 by the aforesaid conductor 55. The slider 94 and resistance 91 cooperate to form a velocity responsive compensating controller 95, and the slider 94 is positioned by a velocity responsive control device 96 connected to and operated by the turbine 25. The slider 94 is moved over the resistance 91 by the control device 96 in accordance with the velocity of the turbine. It may be noted that the slider 94 will normally remain in the position shown upon a conductive bar 89 at the right-hand end of resistance 91, but will swing to the left upon the velocity of the turbine exceeding a predetermined value. The bar 89 is provided so that minor accelerations of the turbine will have no effect upon the system.

The network 54 also includes a slidewire resistance 97, the left-hand terminal of which is connected by a conductor 98 to the conductor 93 leading to the intermediate tap 99 on winding 90 and the right-hand terminal of which is connected by a conductor 100 to the right-hand terminal of winding 90a. A slider 101 to which the aforesaid conductor 53 is connected cooperates with the resistance 97 to form a follow-up potentiometer 102. The slider 101 is moved along the resistance 97 by a connection to the shaft 34a, the slider movement being thus concurrent with that of the waste gate 28.

Since the operation of the electrical control system is set out in detail in the aforementioned Taylor patent, it will be only sufficiently described herein to make clear the need and reason for my present improvements.

The primary windings of all of the transformers 60, 73, and 90 are connected to the same alternating current source as the primary 41 of transformer 40. To simplify the drawing, these connections have been omitted. In actual practice, only one transformer needs to be employed, secondary windings 60b, 73b, and 90b being formed as additional windings of transformer 40. In either case, the alternating potentials at the respective terminals of these transformer windings are at all times in phase with each other. The signal potential impressed across the amplifier input terminals 51 and 52 will thus be the algebraic sum of a number of potentials developed in the three networks 54, 56, and 58.

For convenience in description, the potential conditions existing during a half cycle at which the transformer windings have the polarities indicated by the legends will be considered. For a reference potential the conductor 59 is indicated as grounded, or of zero potential to ground, as shown at 103.

In the network 58, then, the slider 64 in the position shown is positive with respect to the center tap of the transformer while the slider 70, being at a mid-point along the resistance 67, is at a negative potential with respect to the center tap. This network is thus seen to introduce a potential into the series circuit connecting the amplifier input terminals of such polarity that the slider 70 and conductor 57 are negative with respect to grounded conductor 59.

Turning now to the network 56 it will be seen that with the slider 77 in the position shown, this network introduces into the series circuit a potential equal to the potential of slider 77 with respect to the left terminal of transformer winding 73b. This potential is then such that conductor 55 is positive with respect to slider 77. The potential of conductor 55 with respect to ground depends upon the relative magnitudes of the respectively negative and positive potentials produced by the networks 58 and 56. For convenience this potential may be considered to be such that conductor 55 is positive with respect to grounded conductor 59.

Considering finally the network 54, it will be evident that since slider 94 is at the right-hand extremity of the resistance 91, the conductor 93 leading to the tap in the transformer winding 90 is at the same (positive) potential with respect to ground as is the conductor 55, leading to this network. The resistance 97 being connected between this point, or conductor 93, and the now negative terminal of the winding 90, the conductor 53 thus is negative with respect to conductor 93 by an amount dependent upon the value of the resistance between slider 101 and conductor 98. Thus network 54 introduces a negative potential into the series circuit and under a condition of balance the magnitude of this negative potential is equal to and opposes the positive potential produced by the algebraic sum of the effects of networks 56 and 58.

Under such conditions the amplifier input terminal 51 is at the same ground potential as is terminal 52, no signal is then impressed in the amplifier, and the amplifier supplies no current to the motor field winding 36. The waste gate 28 then remains stationary. However, should any of the sliders be shifted from their positions at which the compound network is balanced a signal potential will develop across the amplifier input terminals resulting in the supply of an operating current to the motor field winding 36 such as to cause the motor 34 to rotate and change the position of the waste gate.

For example, consider the result of a rise in pressure in the engine induction system. The bellows 80 is then expanded and the slider 77 is moved to the left along the resistance 74, reducing the magnitude of the positive potential introduced by the network 56 into the series circuit. This positive potential is thus made insufficient to completely cancel or oppose the sum of the negative potentials introduced by the networks 58 and 54 and a signal potential appears at the amplifier input terminal 51 such that this terminal is negative with respect to terminal 52. It is assumed that the amplifier and motor are properly connected to respond to a signal of this polarity or phase so that the amplifier supplies motor field winding 36 with an alternating current potential of the proper phase relation to cause the motor to rotate in proper direction to move the waste gate 28 toward open position. At the same time the slider 101 is moved toward the left along the resistance 97.

The opening movement of the waste gate 28 reduces the pressure of the exhaust gases exerted on the turbine 25, causes the speed thereof to decrease and reduces the compressing effect of the compressor 12. The pressure of the air supplied to the engine 10 and to bellows 80, is now reduced and the slider 77 begins to work back to the right along resistance 74. The movement of the slider 101 to the left along resistance 97, coincident with the opening movement of the waste gate 28, introduces a balancing positive potential into the series network and this movement will continue until this balancing potential is exactly equalled by the potential introduced by operation of the controller 78 and the series network is again balanced. The motor 34 then stops, leaving the waste gate in the newly selected position.

In similar manner, a decrease in discharge pressure of the supercharger 12 will introduce an opposite potential by action of the controller 78, causing a signal of opposite phase to be applied to the amplifier which then runs the motor in the opposite direction to close the waste gate and boost the pressure. Such operation is accompanied by a rebalancing movement of the slider 101 to bring the network to balance again.

The same actions occur upon the movement of either of the manually adjusted sliders 64 and 70, and it will be evident without further description herein that, when properly functioning and energized, the system will permit the selection of any desired discharge pressure for the supercharger under control of controller 66 and will maintain such pressure by means of controller 78.

The function of the controller 95 will likewise be apparent, it serving to introduce a potential into the network such as to open the waste gate 28 when the velocity of the turbine exceeds a maximum safe value. Such limiting control on the speed of the turbo supercharger unit is effective so long as the electrical circuit is intact and properly energized, and while conditions throughout are within range of control.

If the source of electrical energy fails or if any of the sliders fail to make proper contact with their associated resistors, the waste gate will tend to remain in the position to which it has been moved. Or if the amplifier fails to function properly, the electric motor may drive the waste gate to closed position and maintain it there regardless of what value the induction pressure assumes. As a result, the pressure on the discharge side of the supercharger may assume an unsafe value. Severe damage may result to the engine in maintaining such high pressures for even a short period of time.

The present invention is concerned with an improvement in means for insuring movement of the waste gate towards open position even in the event of such abnormal pressures even if the electrical system is completely inoperative. Generally, as indicated above, I provide a turbine in connection with motor 34 which is effective to rotate the rotor shaft and the gear train to drive the waste gate towards open position upon air being supplied to the turbine supercharger. The details of the motor and the various features of my invention associated with it are shown in Figures 2 and 3. These same features are shown schematically in Figure 1 along with the means for supplying air at a controlled pressure to the air turbine. Referring first to Figure 2, the numeral 110 is employed to designate an air turbine wheel. This air turbine wheel has a body portion having struck out tongues 111 forming turbine blades. The turbine wheel 110 is secured to a hub member 112. The hub member is in turn secured to a shaft 114. Rigidly secured to the shaft 114 is a conical oil seal member 115 which is provided on its left hand conical face with a packing ring 116. The oil seal member 115 is adapted to seat on a sleeve 117 secured within the end of a sleeve 118. The inner end of the latter sleeve seats against a shoulder of the motor housing casting 119. A nozzle block 120 surrounds the sleeve 118 and is held in place by screws 121 which extend through the nozzle block into the housing casting 119. Also held in place by screws 121 is a nozzle plate 122 which has struck out tongues 123 providing means for admitting air through the plate 122 and directing it against the blades 111 of the turbine wheel. The nozzle casting 120 is provided with an annular nozzle chamber 124. The nozzle block 120 is also provided with a throat 127 which is aligned with an aperture 128 extending through an enlarged portion 131 of the wall of housing 119. A coupling member 130 is secured to the housing 119 by any suitable fastening means (not shown) and serves as a means for introducing air into the aperture 128 and hence into the nozzle chamber 124.

The sleeve 118 is held in position by screws 132 which extend through a downwardly extending flange of the nozzle block 120 and into the sleeve 117.

The shaft 114 for the turbine wheel 110 is supported on the left hand side of the turbine wheel by a bearing mounted within the sleeve 117. On its right hand side, it is supported in a bearing secured within a central aperture of a plate 134. The plate 134 is mounted against a shoulder portion 135 of the housing casting 119, being held in place by a sleeve 136 which abuts against plate 134. Abutting against the right hand end of body portion 119 of the sleeve 136 is a diaphragm 137. A stud member 138 extends through the plurality of backing plates secured on opposite sides of the diaphragm and is adapted to engage the right hand end of shaft 114. A clip member 139 secured to stud member 138 extends into a slot adjacent the end of shaft 114 and retains the latter in engagement with stud 138. Enclosing the diaphragm and forming an air chamber therewith is a cap member 140 which has a throat portion 141 communicating with a passage 142 through the enlarged portion 131 of the body housing. A spring 145 biases the diaphragm and shaft 114 to the right. It will be obvious that air pressure admitted on the right hand side of the diaphragm is effective to exert a pressure overcoming the biasing action of spring 145. As will be explained later, upon the admission of air to the chamber on the right hand side of the diaphragm, the diaphragm is effective to force shaft 114 to the left. This movement of diaphragm 137 to the left is limited by a plurality of circumferentially disposed stop pins 147 secured to the plate 134, only one of which appears in the drawing. Slidably secured on the air turbine shaft 114 is a clutch member 148 which is adapted to engage with a clutch member 149 carried by a hollow rotor shaft 151. The oil seal member 115 and the clutch member 148 are spring pressed apart by a spring 155 and are limited in their relative movement by screws 154 which extend slidably through the clutch member 148 and are screw threadedly secured to the oil seal member 115. Upon inward movement of the diaphragm 137 due to air entering the chamber on the right hand side thereof, the air turbine shaft 114 is moved to the left sufficiently to bring clutch members 148 and 149 into engagement. This engagement of these clutch members takes place before diaphragm 137 has engaged the stops 147. The continued movement of the diaphragm after such engagement takes place causes the air turbine shaft 114 to slide with respect to the clutch member 148 against the action of the biasing spring 155 between clutch member 148 and the oil seal member 115 until diaphragm 137 engages the stop pins 147. This causes the biasing spring 155 to exert a force holding the two clutching members 148 and 149 in clutching engagement with each other. By providing the stop pins 147 to limit the movement of the diaphragm, a uniform pressure is exerted upon the clutch members at all differential air pressures above the minimum at which the diaphragm is operated.

Slotted apertures 157 are provided at circumferentially spaced points in the motor housing adjacent the air turbine 110 to permit the escape of air from the housing as the air leaves the turbine blades. Similar apertures 158 are provided through the motor housing on the left hand side of the diaphragm 137 to permit free movement of the diaphragm 137.

The details of the electric motor 34 form no part of the present invention. The rotor 38, as previously indicated, is secured to a hollow shaft 151. Surrounding the rotor 38 is a stator 39 of conventional construction on which the field coils 36 and 37 are secured. A partition wall 160 formed integrally with the motor housing 119 separates the portion of the housing containing the rotor and stator from the portion of the motor just described. A bearing member 161 is secured within a central aperture in this partition wall and serves to support the rotor shaft 151. Also secured within the partition wall 160 is an oil retainer 162 of conventional construction. Extending through the hollow rotor shaft 151 is a solid shaft 163. The hollow shaft and solid shaft are secured in driving relation with each other by a slip clutch 164 which consists of a member 165 rigidly secured to shaft 163 and a member 166 adapted to be pressed into engagement therewith by a spring 167. The member 166 is non-rotatably secured to a shoulder at the left hand end of the hollow shaft 151 in such a manner as to be slidable longitudinally but non-rotatable with respect thereto. The function of the slip clutch 164 is to permit relative slippage of the rotor shaft 151 and the shaft 163 when the movement of the shaft 163 is stopped. The shaft 163 is operatively connected to the gear train 35. The details of this gear train form no part of my invention. The gear train is partially supported by and separated from the rotor and stator by a partition plate 171 which also serves to support a bearing 170 for the shaft 163. The gear train 35 is located within a separate section 172 of the motor housing and the partition plate 171 is clamped between the housing member 119 and housing member 172. The housing containing gear train 35 and the chamber enclosing the motor and stator preferably contain oil to an approximate depth indicated by the line 173. This oil is fed to the various elements of the gear train and to the rotor shaft. It is prevented to a large extent from passing out into the compartment housing the clutch members 148 and 149 by the oil retainer 162. A certain amount of oil will tend to pass through this oil retainer as the latter is subject to wear, however. The stationary oil seal provided by the engagement of oil seal member 115 with the conical surface of flange 117 prevents any such oil that might pass through oil retainer 162 from passing out into the compartment housing the air turbine wheel 110.

Electrical power is supplied to the field windings 36 and 37 through an oiltight terminal block 178. Conductors are led to this block through a grommet 179.

The housing 172 is provided with an end wall 180 which serves to help support the gear train 35 and to support the output shaft 34a, to which is secured the crank arm 34b previously mentioned.

As best indicated in Figure 3, a laminated stop plate 182 is secured to the shaft 34a. Secured to the stop plate is a laminated V-shaped contact arm assembly 101 which slidably engages the potentiometer winding 97 secured to a plate 186.

The stop plate 182 has a relatively wide central portion secured to the shaft 34a and a pair of oppositely extending integral wing portions 187 and 188. These wing portions extend from a point on the stop plate 42 which is circumferentially spaced from its central portion. The wing portions are considerably elongated, and conform generally to the central portion of the stop plate 42 but are spaced therefrom. The extremities of the wing portion are spaced laterally from the sides of the central portion of plate 182 by relatively small gaps as shown in the drawing. A stop member 189 is rigidly secured to the housing 170 and is so positioned as to be engaged by the outer extremity of the wing portion 188 upon continued clockwise rotation of shaft 34a as viewed in Figures 1 and 3. The corresponding outer extremity of wing portion 182 is adapted to engage a pivoted stop arm 190 which is pivotally secured to the housing 172 by a screw 191. The stop member 190 is biased in a clockwise direction by a spring 192 which is secured to the housing by a screw fastened spring retainer 193. The left hand end of the spring 192 is secured to the stop member 190. Stop member 190 is provided with a slot 194 through which extends a stud screw 195. The stud screw 195 serves to limit the outward travel of stop arm 190 and also serves to limit its inward movement by spring 192. A roller 198 is carried by the stop arm 190 and engages the outer end of wing portion 187. The elements are shown in Figure 3 in the position which they occupy when the shaft 34a has rotated in a counter-clockwise direction as far as is permitted by the stop member 190. It will be noted that the wing 187 has engaged the roller 198 of stop member 190 and has moved the latter in a counter-clockwise direction against the action of spring 192 as far as is permitted by stud 195.

The wing portions 187 and 188 are slightly resilient and provide, in themselves, a cushioning action when the shaft 34a is rotated to either extreme position. In the case of stop 189, this is all of the cushioning action that is provided. In the case of stop plate 190, the spring 192 provides an additional cushioning action, as will be explained later. Upon the motor reaching either end position, the friction clutch 164 permits continued rotation of rotor 38 and hence avoids any strain on the electric motor or on the air turbine.

Referring back to Figure 1, the means for supplying air to the air turbine and the diaphragm 137 will now be described. Connected to the conduit 13 extending between the supercharger and the after cooler is an air tight housing 200 of a pressure relief valve 199. The connection between conduit 13 and housing 200 is made by a conduit 201. Located within housing 200 is a bellows member 202 which positions a valve 203 seating on a valve seat communicating with an aperture extending out of the bottom wall of housing 200. The bellows 202 is biased by an internal spring (not shown) to a position in which the valve 203 is in engagement with its seat. An adjusting screw 205 extends through the upper wall of the housing 200 and serves to variably compress the internal spring to adjust the setting of the bellows 202. By reason of the connection of housing 200 with conduit 13 through pipe 201, the exterior of bellows 204 is always exposed to the absolute pressure of the air on the discharge side of the supercharger. Whenever this pressure exceeds a predetermined value determined by the setting of screw 205, the bellows 202 is compressed to cause opening of valve 203.

The outlet side of housing 200 is connected through a pipe 206 with a differential pressure responsive relief valve 207. This relief valve consists of a housing 208 having an open end 209. Sealing this open end is a flap valve 210 which is pivotally secured to a bracket 211 extending from the housing 208. The flap valve is biased to closed position by a spring 212, the tension of which is adjusted by a screw 213. Whenever the differential between the pressure of the air in the housing 208 and that of the atmosphere exceeds a predetermined value, the flap valve 210 is opened to permit escape of air until the differential returns to the value for which the relief valve is set. Communicating with the relief valve 208 is a conduit 215 which is connected to the nozzle block 120 and the chamber on the right hand side of diaphragm 137. In Figure 1, the connections between conduit 215 and the nozzle box and diaphragm chamber are shown schematically.

Operation

The normal operation of this system has been described in the previous paragraphs. It will be apparent that normally the waste gate motor 34 is positioned in accordance with the pressure of the air on the intake side of the carburetor so as to maintain this pressure at a value selected by the pressure selector 66. In the event of excessive speeds, the pressure is adjusted by the overspeed responsive potentiometer 95. If at any time the waste gate is moved to either extreme position, the wing portion 188 or 187 as the case may be engages its associated stop member, and the motor 34 will continue to revolve by reason of the slippage of clutch 164.

Let it be assumed now that by reason of the failure of some of the electrical apparatus or more likely by reason of the temporary failure of the power source, the electrical control system for motor 34 loses control of it or improperly controls it so that the motor 34 remains in the position to which it has been moved. Further, let it be assumed that this position is one in which the waste gate is closed to an extent such that excessively high supercharger discharge pressures will be developed at lower altitudes. As the aircraft enters these lower altitudes, the pressure on the discharge side of the supercharger 12 will rise above the setting of the pressure relief valve 199 so as to cause the valve 203 of the relief valve to be opened. Air will thereupon be admitted to both the nozzle block 120 and the chamber on the right hand side of diaphragm 137. The effect of the air entering the nozzle block 120 will be to cause the air turbine 110 to be operated at a relatively high speed. The effect of the air entering the chamber on the right hand side of diaphragm 137 will be to cause the diaphragm to move clutch member 148 to the left into engagement with clutch member 149. This engagement of clutch members 148 and 149 causes the turbine 110 to be operatively connected to rotor 38. As previously explained, the blades of the turbine are so designed that the turbine rotates in a direction to move the waste gate 28 towards open position. In other words, the crank 34b will be rotated in a counter-clockwise direction as viewed in Figure 1. The turbine is capable of overpowering the rotor if it is tending to drive in waste gate closed direction. This will cause movement of the slider 101 with respect to the resistor 97 and will also cause movement of stop plate 182 in a counter-clockwise direction so that the wing portion 187 engages the stop arm 190. If by any chance, the fault of the system lies solely in the contact arm 101 resting upon a dead or dirty spot of resistor 97, the movement of contact arm 101 may result in its moving to a position at which the circuit between contact arm 101 and resistor 97 is reestablished, thus reestablishing the control of the electrical system over the motor 34. Since, under these circumstances, the effect of the electrical system would be to drive the motor 34 to waste gate open position, the motor 34 will assist the air turbine and a rapid movement of the waste gate towards open position will result.

Regardless of whether the fault lies in a faulty contact between slider 101 and resistor 97, the air turbine will be effective to cause continued rotation of the shaft 34a and stop plate 182 in a counter-clockwise direction. The wing portion 187 will engage the stop arm 190 and will move this stop arm in a counter-clockwise direction against the action of spring 192. Normally, this movement will occur until the arm 190 has moved to its extreme left hand position in which the stud 195 is in engagement with the right hand end of slot 194.

The movement of the shaft 34a by the turbine 110 can occur at a relatively rapid rate. By maintaining the air turbine on the same shaft as the rotor, I have provided an arrangement in which the entire motor assembly is relatively compact. Furthermore, the slip clutch between the rotor and the gear train is effective to permit slippage between the air turbine and the output shaft as well as between the electric rotor and the output shaft. This arrangement has the disadvantage, however, due to the variation in pressure differential across the turbine with variation in altitude, that the air turbine may be revolved with such force as to cause injury to the apparatus associated with the electric motor. This is prevented in my arrangement by the pressure differential relief valve 207 and by the yieldable stop 190. Referring to the pressure relief valve 207, the valve serves to limit the pressure which is applied to the air turbine and hence to limit the maximum speed thereof. This has the advantage not only of protecting the various elements of the motor driven by the turbine but also in preventing damage to the turbine itself from an excessive pressure differential being applied thereto.

The yieldable stop 190 serves to absorb the shock resulting from the operation of the output shaft 34a by the air turbine at the relatively high speed at which the air turbine is effective. By reason of this spring 92, the shock of the opening movement of shaft 34a is absorbed both by the resiliency of wing portion 187 of stop plate 182 but also by spring 192.

The yieldable stop 190 has a further very important function. As soon as the pressure within conduit 13 has dropped below the value at which the relief valve 199 is set to operate, air is no longer supplied to the turbine and to the diaphragm 137. The air turbine is thus declutched from the electric motor and hence from the output shaft 34a. The spring 192 is designed so as to have sufficient resiliency to rotate the output shaft 34a backwards against the retarding effect of the gear train and the inertia of rotor 38 when no torque is being exerted by either the air turbine or by the rotor 38. Thus, as soon as the pressure within conduit 13 drops below the critical value, the spring 192 is effective to move the shaft 34a in a clockwise direction (as viewed in Figures 1 and 3) to cause the waste gate 28 to move partially towards closed position. The slot 194 is of such length and the stud 195 is so located that when the stop arm 190 has moved to its extreme right hand position, the waste gate will be in a position at which the exhaust gas tends to close the waste gate. As long as the waste gate is in its wide open position, the exhaust gas has no effect upon the position of the waste gate. As soon, however, as it is turned away from this wide open position, the exhaust gas has a tendency to close the waste gate. This effect is aided by the vibration of the engine. Thus, following a rise in pressure to an unduly high value so that the air turbine drives the waste gate to open position, the waste gate is moved back towards closed position first by the spring 192 and then by the effect of the exhaust gases on the waste gate. A power failure, such as leads to the operation of the air turbine, may well occur under conditions in which it is undesirable for the pilot to be deprived of all supercharging effect. By providing the spring 192 the waste gate is automatically returned gradually to a closed position so as to provide a supercharging effect. Whenever the waste gate moves too far to closed position, the air turbine will again be brought into operation to cause the waste gate to again be driven towards open position. Thus, despite the fact that the electrical system is rendered completely inoperative, the pressure is maintained at a value which will permit operation of the airplane at a pressure which will result in sufficient power being supplied to the airplane for operation under normal conditions. Moreover, provision is made for quickly opening the waste gate completely to reduce the pressure as rapidly as possible when a critical pressure condition exists.

My invention is concerned with the features of the clutch between the air turbine and the electric motor 34 and the oil seal provided by member 115 and flange 117, together with the diaphragm means for operating the same. The remaining features disclosed are claimed in the co-pending application of Stephen Crum referred to above. The clutch provided by members 148 and 149 has two very important functions. In the first place, it disconnects the air turbine from the electric motor so that the electric motor is not subjected to the continual load that would be present if the air turbine were permanently connected to the same. Since the air turbine must be designed to overpower the motor, it obviously would constitute a considerable drain on the motor to have to rotate the air turbine at all times when it was operating. By providing the clutch constituted by members 148 and 149, this difficulty is eliminated.

Furthermore, provision of the clutch makes it possible to use an oil seal maintained by two normally stationary members. It is extremely difficult to provide an effective oil seal between two relatively rotating members which does not offer any appreciable friction. It obviously would be necessary to have a relatively friction free oil seal in connection with the turbine, as otherwise the oil seal would seriously impede operation of the turbine. By providing the clutch, it is possible to use an oil seal of the type disclosed in which the oil seal is provided by the engagement of two normally stationary members. The only time that this oil seal is broken is when the turbine is being rotated. This, of course, is an abnormal condition. Such an oil seal is particularly valuable during shipment of the motor since it guards against the loss of oil due to the motor being shipped in a position in which the oil is assisted by gravity to flow from the motor compartment into the turbine compartment.

It will be seen that I have provided a novel motor arrangement in which an electric motor is at all times connected to an output shaft and in which an air motor is selectively connected when it is desirable to operate the output shaft independently of the electric motor. Furthermore, I have provided a novel means for connecting the air turbine to the electric motor so that the air motor is effectively disconnected from the electric motor when the electric motor is operating normally. It will also be seen that I have provided a novel oil sealing arrangement in connection with such a motor unit.

While I have shown a specific form of my invention for purposes of illustration, it is to be understood that the invention is to be limited only by the scope of the appended claims.

I claim as my invention:

1. In combination, an electric motor an output shaft operatively connected to said motor, a fluid turbine also adapted to be operatively connected to said output shaft in the event of said electric motor not being properly operative, a clutch between said turbine and said output shaft and having a movable portion biased into declutched position, means for causing pressure fluid to be admitted to said turbine and for causing said turbine to be shifted axially in a direction to cause engagement of said clutch, a housing having a first compartment enclosing said electric motor and a further compartment enclosing said turbine and separated from said first compartment by a partition wall, said motor compartment being adapted to contain oil, and an oil seal member connected to the movable portion of the clutch and biased into engagement with said wall by the biasing means for the clutch to prevent oil passing from said motor compartment to said turbine compartment when said clutch is disengaged.

2. In combination, an electric motor having a stator and a rotor, an output shaft operatively connected to said rotor, a rotary fluid motor mounted coaxially relative to said rotor and adapted to be operatively connected to said rotor, a normally disengaged clutch between said fluid motor and said rotor, means for causing pressure fluid to be admitted to said turbine and for causing said fluid motor to be shifted axially in a direction to cause engagement of said clutch, an oil retaining enclosure for said electric motor, and a normally stationary oil seal member secured to and movable axially with said fluid motor, said oil seal member being effective when said fluid motor is in an axial position in which said clutch is disengaged to seal against the escape of oil from said enclosure.

3. In a motor arrangement, an electric motor having a stator and a rotor, a rotor shaft supporting said rotor, an output shaft operatively connected to said rotor shaft, a fluid turbine and a shaft therefor disposed coaxially relative to said rotor, cooperating clutch members carried by said rotor and turbine shafts, an oil retaining enclosure for said electric motor, an oil sealing member associated with the clutch member carried by said turbine shaft for preventing the escape of oil from said motor enclosure, and means for causing selective engagement and disengagement of said clutch members in such a manner that when said output shaft is being driven by said electric motor said fluid turbine is disconnected from said rotor.

4. In a motor arrangement, an electric motor having a stator and a rotor, a rotor shaft supporting said rotor, an output shaft operatively connected to said rotor shaft, a fluid turbine having turbine buckets and a shaft therefor disposed coaxially relative to said rotor, stationary turbine nozzles, cooperating clutch members carried by said rotor and turbine shafts, a pressure responsive member disposed coaxially of said turbine shaft and adapted to bear against the end thereof and shift said turbine shaft and turbine axially in clutch engaging direction and move said turbine buckets in close proximity of said nozzles, and means for admitting pressure fluid to said turbine through said nozzles and to one side of said pressure responsive member to cause the latter to move said clutch members into engagement.

5. In a motor arrangement, an electric motor having a stator and a rotor, a rotor shaft supporting said rotor, an output shaft operatively connected to said rotor shaft, a fluid turbine and a shaft therefor disposed coaxially relative to said rotor, cooperating clutch members carried by said rotor and turbine shafts, an oil retaining enclosure for said electric motor, an oil sealing member associated with the clutch member carried by said turbine shaft for preventing the escape of oil from said motor enclosure, a pressure responsive member adapted to bear against the end of said turbine shaft and shift said turbine shaft axially in clutch engaging direction, and means for admitting pressure fluid to said turbine and to one side of said pressure responsive member to cause the latter to move said clutch members into engagement.

6. In combination, a compressor, means for controlling the compressing effect of said compressor, a rotary electric motor for positioning said controlling means, means responsive to a condition affected by the discharge pressure of the compressor for controlling the energization of said electric motor, a fluid turbine mounted coaxially with respect to said electric motor, means responsive to the discharge pressure of said compressor and effective when said pressure exceeds a predetermined value to supply a portion of the compressed fluid to said turbine, and a clutch between said electric motor and said fluid turbine, said clutch being disengaged when said controlling means is positioned properly by said electrical motor.

7. In combination, a compressor, means for controlling the compressing effect of said compressor, a first motor for positioning said controlling means, and employing a normal driving medium, means responsive to a condition affected by the discharge pressure of the compressor for controlling the supply of said driving medium to said first motor, a fluid driven second motor normally disconnected from said first motor and having no effect on the same, and means responsive to the discharge pressure of said compressor and effective when said pressure exceeds a predetermined value to connect said second motor in driving relation to said first motor and to supply a portion of the fluid compressed by said compressor to said second motor so as to position said controlling means without the aid of said normal driving medium.

8. In combination, a compressor, means for controlling the compressing effect of said compressor, a rotary electric motor for positioning said controlling means, means responsive to a condition affected by the discharge pressure of the compressor for controlling the energization of said electric motor, a fluid operated rotary motor, means responsive to the discharge pressure of said compressor and effective when said pressure exceeds a predetermined value to supply a portion of the compressed fluid to said turbine, and a clutch between said electric motor and said fluid operated motor, said clutch being disengaged when said controlling means is positioned properly by said electrical motor.

WILLIS H. GILLE.

REFERENCES CITED

The following references are of record in the file of this patent:

UNITED STATES PATENTS

| Number | Name | Date |
|---|---|---|
| 1,241,372 | Guyer | Sept. 25, 1917 |
| 1,724,125 | Carrey | Aug. 13, 1929 |

FOREIGN PATENTS

| Number | Country | Date |
|---|---|---|
| 332,055 | Great Britain | July 17, 1930 |
| 457,674 | Germany | Mar. 21, 1928 |
| 695,014 | France | Sept. 23, 1930 |